United States Patent
Saito et al.

[11] Patent Number: 6,064,200
[45] Date of Patent: May 16, 2000

[54] MAGNETIC SENSOR WITH DETECTION BLOCK, CONNECTOR BLOCK AND CAP/COVER

[75] Inventors: Kiyoshi Saito, Hirakata; Takamichi Hattori, Katano; Yasushi Ishiai, Osaka; Noriyuki Jitosho, Moriguchi; Shinjiro Ueda, Katano, all of Japan

[73] Assignee: Matsushita Electric Industrial Co., Ltd., Osaka, Japan

[21] Appl. No.: 08/809,327

[22] PCT Filed: Jul. 22, 1996

[86] PCT No.: PCT/JP96/02038

§ 371 Date: Jul. 15, 1997

§ 102(e) Date: Jul. 15, 1997

[87] PCT Pub. No.: WO97/04318

PCT Pub. Date: Feb. 6, 1997

[30] Foreign Application Priority Data

Jul. 21, 1995 [JP] Japan ..................... 7-185223

[51] Int. Cl.[7] ................. G01P 3/488; G01B 7/30
[52] U.S. Cl. ..................... 324/207.25; 324/173
[58] Field of Search ..................... 324/174, 173, 324/207.15, 207.16, 207.25, 207.2, 207.21; 29/592.1, 595, 602.1, 607; 338/32 R, 32 H

[56] References Cited

U.S. PATENT DOCUMENTS

| | | | |
|---|---|---|---|
| 5,121,289 | 6/1992 | Gagliardi | 324/207.2 |
| 5,414,355 | 5/1995 | Davidson et al. | 324/207 |
| 5,416,410 | 5/1995 | Kastler | 324/174 |
| 5,563,510 | 10/1996 | Gorrell et al. | 324/174 |
| 5,631,556 | 5/1997 | Shibata | 324/174 |

FOREIGN PATENT DOCUMENTS

| | | |
|---|---|---|
| 0 330 815 | 9/1989 | European Pat. Off. . |
| 0 571 129 | 11/1993 | European Pat. Off. . |
| 38 27 937 | 2/1990 | Germany . |
| 0 446 440 | 2/1996 | Germany . |
| 5-52703 | 7/1993 | Japan . |
| 5-55007 | 7/1993 | Japan . |
| 6-76864 | 10/1994 | Japan . |
| 8-43415 | 2/1996 | Japan . |

*Primary Examiner*—Walter E. Snow
*Attorney, Agent, or Firm*—McDermott, Will & Emery

[57] ABSTRACT

The present invention relates to a direct connector type magnetic revolution sensor for detecting the number of revolutions of a rotating axis in for example an automotive transmission, and intended to present reliable, yet inexpensive, magnetic revolution sensors, with which the varying connector specifications are easily met by using a detection block as the common component.

The magnetic revolution sensor comprises a detection block(2); a cap(1) for protecting the block; and a connector block(3) having a flange(3a) on which a space for installing said detection block(2) and said cap(1) is provided, as well as connector terminals(10) in the other end thereof separated by said flange(3a). The detection block(2) attached on said installing space being electrically coupled with said connector terminals (10). The detection block, a key component for the reliability, is used as the common constituent component having an established reliability. Thus, when meeting a new connector specification of a customer, a new magnetic revolution sensor may be made available by modifying only the connector block and the cap; without sacrificing the reliability, suppressing the accompanying cost. The leadtime needed for development work is significantly reduced either.

9 Claims, 8 Drawing Sheets

6,064,200

1

MAGNETIC SENSOR WITH DETECTION BLOCK, CONNECTOR BLOCK AND CAP/COVER

TECHNICAL FIELD

The present invention relates to a direct connector type magnetic revolution sensor for detecting the number of revolutions of an axis of rotation in for example a car transmission.

BACKGROUND ART

A conventional magnetic revolution sensor is described referring to FIG. 7.

In FIG. 7, symbol 3 represents a connector block comprised of an insulation material. The connector block 3 comprises a bias magnet 7 fixed mechanically in one end, a magnetic detector 8 attached mechanically to said bias magnet, and a circuit section 5 electrically coupled with said magnetic detector 8 via a relay terminal 6 provided in said connector block 3. Also a cap 1 for protecting the magnetic detector 8 etc. is provided mechanically fixed to a flange 3a of said connector block 3. In the other end, being separated by said flange 3a, of said connector block 3 is a male connector section 3b which provides connector terminals 10 electrically coupled to said circuit section 5.

In the following, the operation will be described with reference to FIG. 8. When a revolving magnetic member 9 having a protrusion 9a comes close to the tip top of cap 1 a magnetic circuit is formed with said bias magnet 7 with said magnetic detector 8 in between. The density of magnetic flux to be given to said magnetic detector 8 varies depending on the relative positioning between said protrusion 9a and said bias magnet 7. The variation is converted into electrical signal, which is processed by said circuit section 5 to be outputted as a sensor signal from said male connector section 3b.

In the above described conventional direct connector type magnetic revolution sensor, however, the connector section had to be manufactured in accordance with varying specifications of customers. Which means the moulds have to be prepared for each of the customer specifications, and the reliability has to be confirmed for each of the sensors. This naturally gives an adverse effect on the time and the manpower, providing a negative influence on the product cost. Thus the performance per cost was low for a product manufactured by moulding process.

The present invention is aimed to solve the above described problems, and intended to present a reliable, yet inexpensive, magnetic revolution sensor in which the modification of connector specifications is easy.

DISCLOSURE OF THE INVENTION

A magnetic revolution sensor according to the present invention comprises a detection block, a cap for protecting the detection block, and a connector block having a flange provided with a space for installing said detection block and said cap, as well as connector terminals in the other end thereon separated by said flange, said detection block being electrically coupled with said connector terminals.

With the above described constitution, a magnetic revolution sensor can meet the varying connector specifications of many customers, by modifying only the connector block and the cap. The detection block, being the key component for the reliability, may be used as the common constituent component with which a sufficient reliability is established.

2

Thus, when meeting a new requirement of a customer, a new magnetic revolution sensor may be made available by modifying only the connector block and the cap; suppressing the accompanying cost, and without sacrificing the reliability. The leadtime needed for the development is much reduced.

BEST MODE FOR CARRYING OUT THE INVENTION

EMBODIMENT 1

Figure 1:
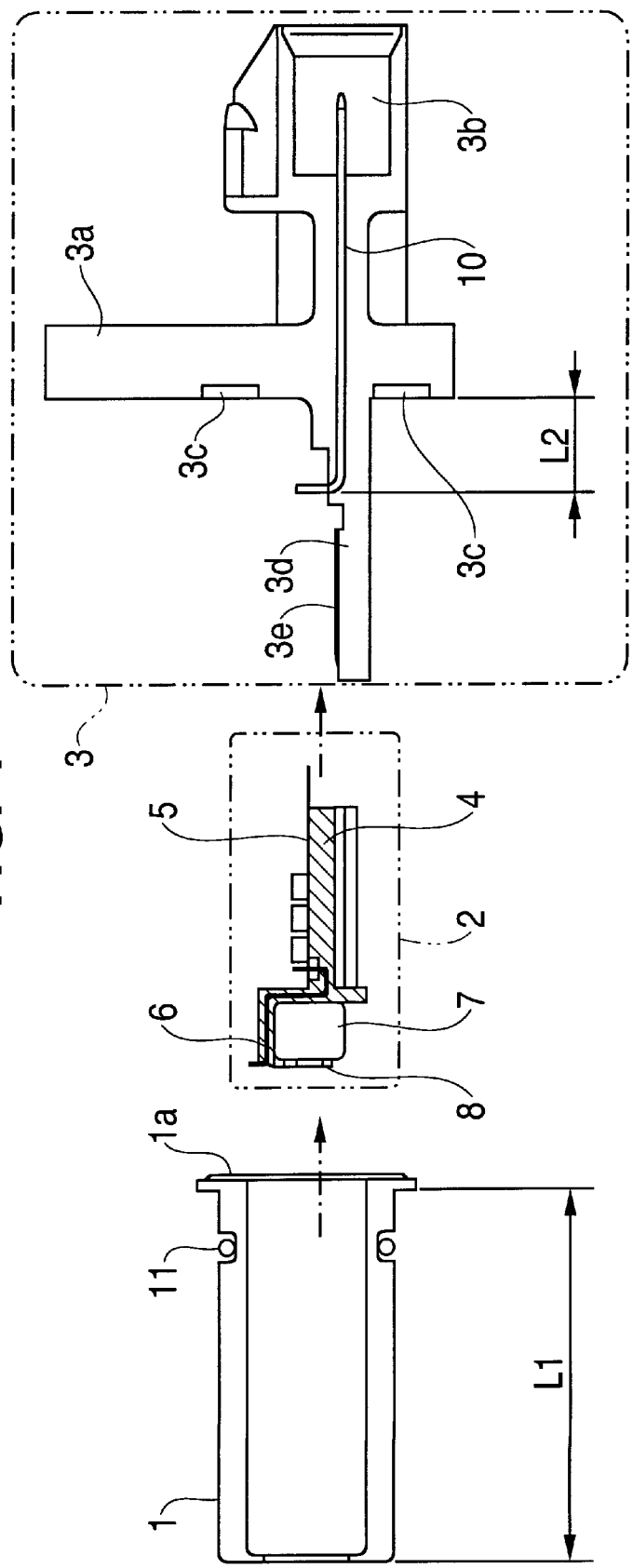
FIG. 1 is an assembly chart showing a magnetic revolution sensor according to a first embodiment of the present invention.

In the following, a magnetic revolution sensor according to a first embodiment of the present invention will be described referring to FIG. 1. As shown in FIG. 1, a magnetic revolution sensor according to the present embodiment is comprised of three major blocks; a detection block 2, a cap 1 for protecting the detection block, and a connector block 3 for the installation of the foregoing two items. Said connector block 3 is provided with a space 3d for installing the detection block 2 in one end separated by the flange 3a, and a male connector section 3b in the other end. Said detection block 2 comprises a holder 4 comprised of an insulation material, a bias magnet 7 mechanically fixed to one end of said holder 4, a magnetic detector 8 mechanically attached to said bias magnet 7, and a circuit section 5 electrically coupled with said magnetic detector 8 via a relay terminal 6 provided on said holder 4. Leadwires of said magnetic detector 8 are welded by electric resistance welding to the relay terminal 6, meanwhile said circuit section 5 is constituted on a flexible circuit board.

Said detection block 2 is coated with a water-repellent material, and is tentatively fixed by a rib 3e provided on the installation space 3d of said connector block 3, and finally fixed to said connector block 3 by gluing. Said cap 1 is made to have a thinner wall thickness at the top part where the magnetic detector 8 of said detection block 2 is faced, and is provided with an O-ring 11 for oil sealing on the outer surface, and is fixed to a groove 3c provided on flange 3a of said connector block 3 by ultrasonic welding.

Said connector terminals 10 are disposed on said connector block 3, in the other end of said cap 1 and said detection block 2 separated by said flange 3a; one end of which is led to said installation space 3d, the other end to said male connector section 3b, for electrically coupling said detection block 2 and said connector terminals 10.

The assembly of a magnetic revolution sensor according to the present embodiment is started with the assembly of detection block 2. Bias magnet 7 is glued or by such other method to holder 4, on the tip top of bias magnet 7 a magnetoresistive element or a semiconductor-type magnetoresistive element is attached by gluing as the magnetic detector 8. Leadwire of magnetic detector 8 is electrically connected with one end of relay terminal 6 by electric resistance welding. The other end of relay terminal 6 is electrically connected by soldering with circuit section 5 disposed on holder 4. This completes the provisional assembly of the detection block 2.

The above described detection block 2 is attached to connector block 3 by fitting the holder 4 to the installation space 3d; first tentatively fixed by rib 3e provided on the installation space 3d, and then finally fixed by gluing. Circuit section 5 is electrically connected by soldering to connector terminals 10 of connector block 3. The connector block 3 on which the detection block 2 is mounted is attached with a cap 1 for protecting the detection block 2; the cap 1 is ultrasonic-welded to groove 3c provided on flange 3a of connector block 3. On the opening surface of cap 1, a ring protrusion 1a whose cross section has a triangle shape is provided; to be welded to flange 3a in the vertex of the triangle of protrusion 1a.

Figure 2:
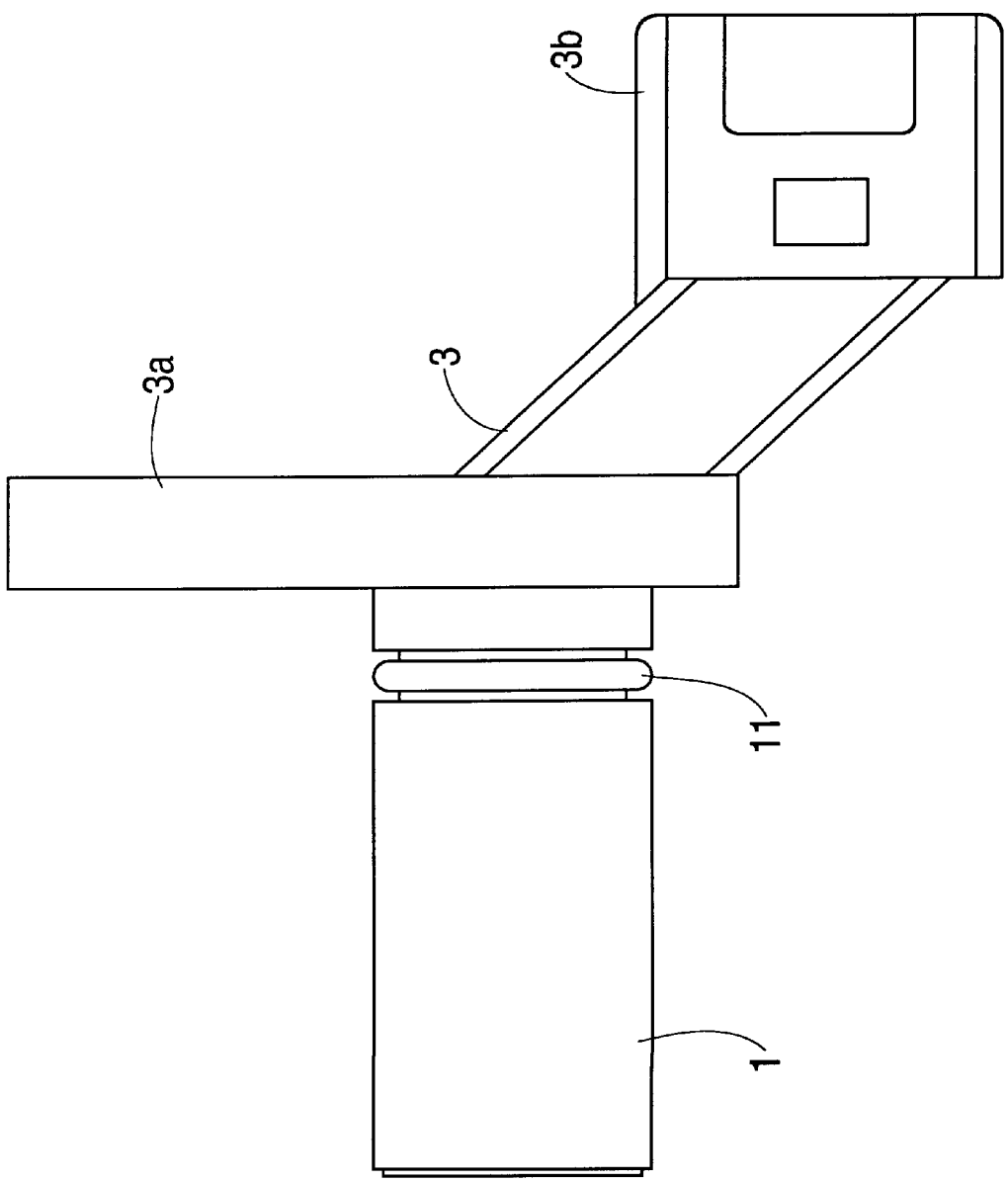
FIG. 2 is a front view of the magnetic revolution sensor of FIG. 1.
Figure 3:
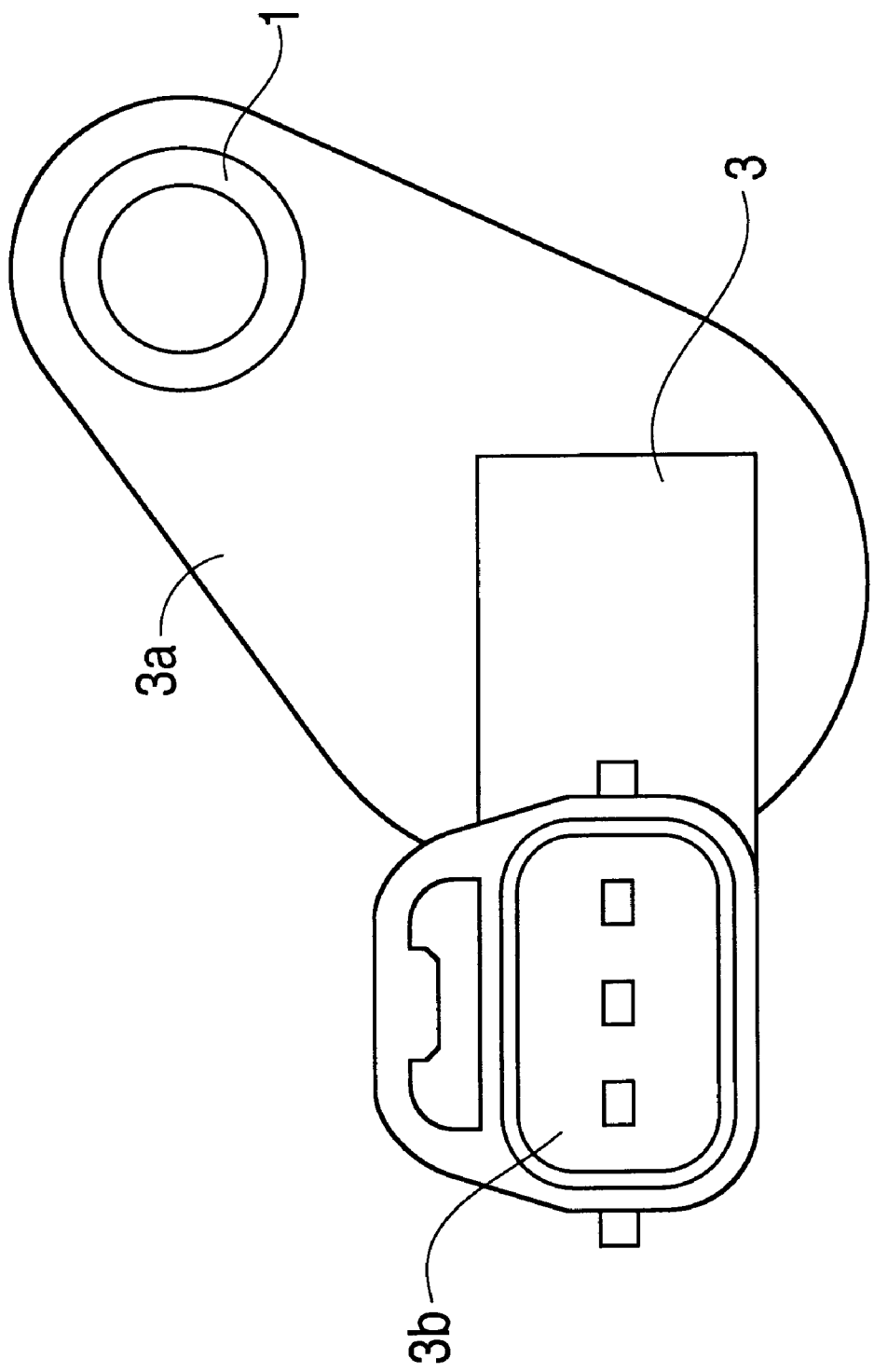
FIG. 3 is a side view of the magnetic revolution sensor of FIG. 1.

A magnetic revolution sensor thus assembled is constituted into a version as shown in FIG. 2 and FIG. 3, to be installed in an automotive transmission etc. The O-ring 11 provided around the outer surface of cap 1 works by its elasticity to fix the sensor against the inner wall surface of a hole provided in a transmission etc.

When different specifications, for example a different shaped male connector section 3b for meeting a customer connector, a different protrusion length from flange 3a of magnetic detector 8, are requested by customers, a magnetic revolution sensor according to the present embodiment can satisfy the requirements by providing only a plurality of connector blocks 3 having different shaped male connector section 3b, or different protrusion length L2 of connector terminals 10 over the flange 3a, and a plurality of caps 1 having different protrusion length L1, with the detection block 2, a sensor, used as the common component.

A magnetic revolution sensor according to the present embodiment is provided with cap 1 whose wall thickness is thinner at the top part, so as the magnetic detector 8 of detection block 2 makes a closer access to a protrusion 9a of revolving magnetic substance 9. The magnetic flux in the magnetic circuit comprising bias magnet 7 becomes denser; as a result, the operational reliability within a range of magnetic sensitivity of magnetic detector 8 is increased and the detection accuracy is improved.

In a magnetic revolution sensor according to the present embodiment, cap 1 is welded to flange 3a of connector block 3 by ultrasonic welding, and O-ring 11 provided on the outer surface of cap 1 presses the inner wall surface of a hole provided in a transmission etc.; therefore, the oil-sealing character is enhanced. Furthermore, the detection block 2 is coated with a water-repellent material; therefore, even in a case when the inside of cap 1 is invaded by water the magnetic detector 8, circuit section 5 etc. are less affected by the water.

Figure 8:
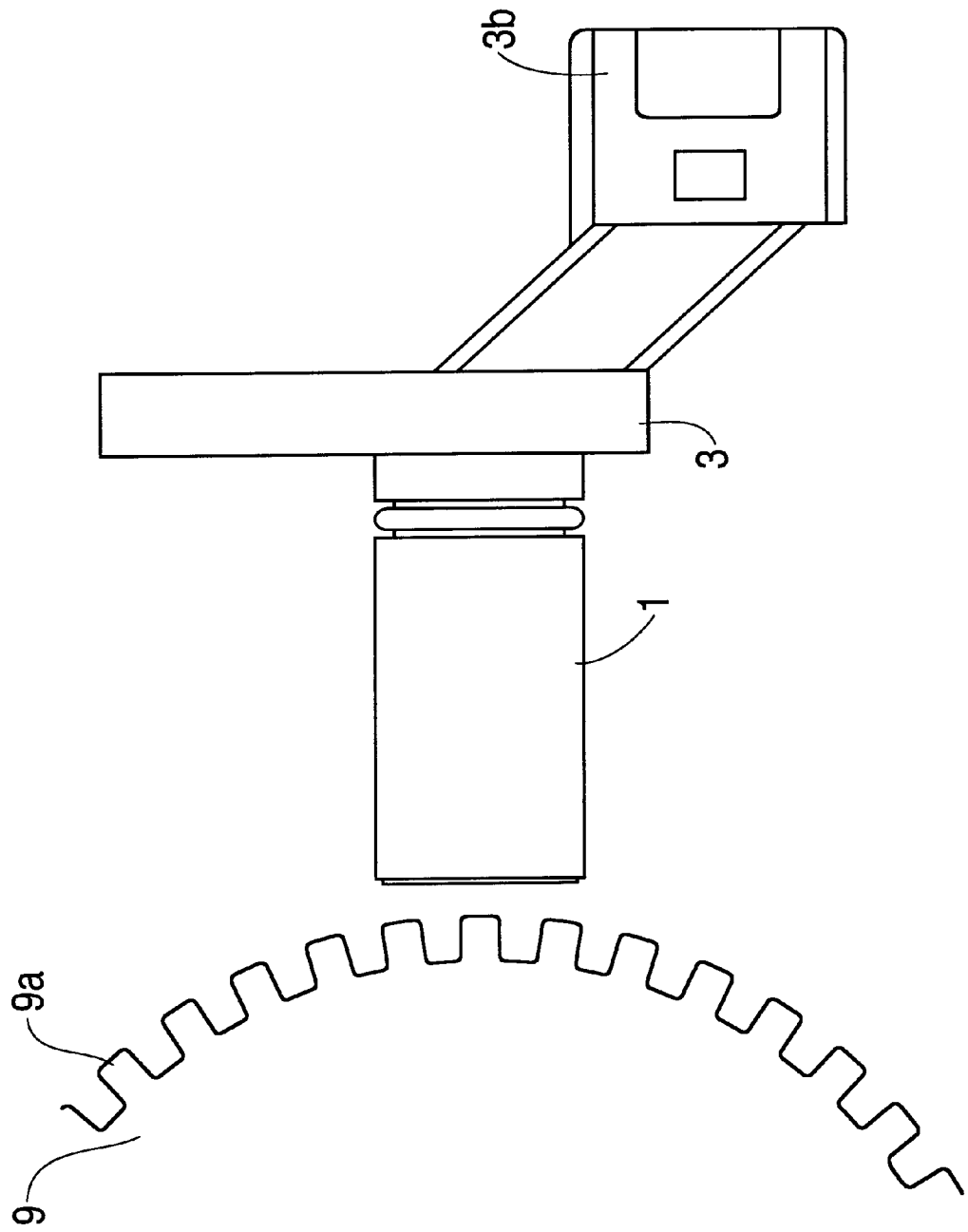
FIG. 8 is a chart describing the operation of the magnetic revolution sensor of FIG. 7.

Now in the following, the operation will be described referring to FIG. 8. As shown in FIG. 8, when a revolving magnetic substance 9 having protrusion 9a is placed in proximity with the tip top of cap 1, a magnetic circuit is formed with said bias magnet 7, with said magnetic detector 8 in between. The density of magnetic flux to be applied on said magnetic detector 8 varies according to the change in the relative positioning between said protrusion 9a and said bias magnet 7, and the variation is converted into electric signal, which is processed by said circuit section 5 to be outputted from said male connector section 3b as the sensor signal.

In the present embodiment, the circuit section 5 of detection block 2 may be formed by using the relay terminal 6 provided on said holder 4 as the circuit wiring.

Although in the present embodiment one end of the connector block 3 is made as a male connector, it may of course be a female connector instead.

EMBODIMENT 2

Figure 4:
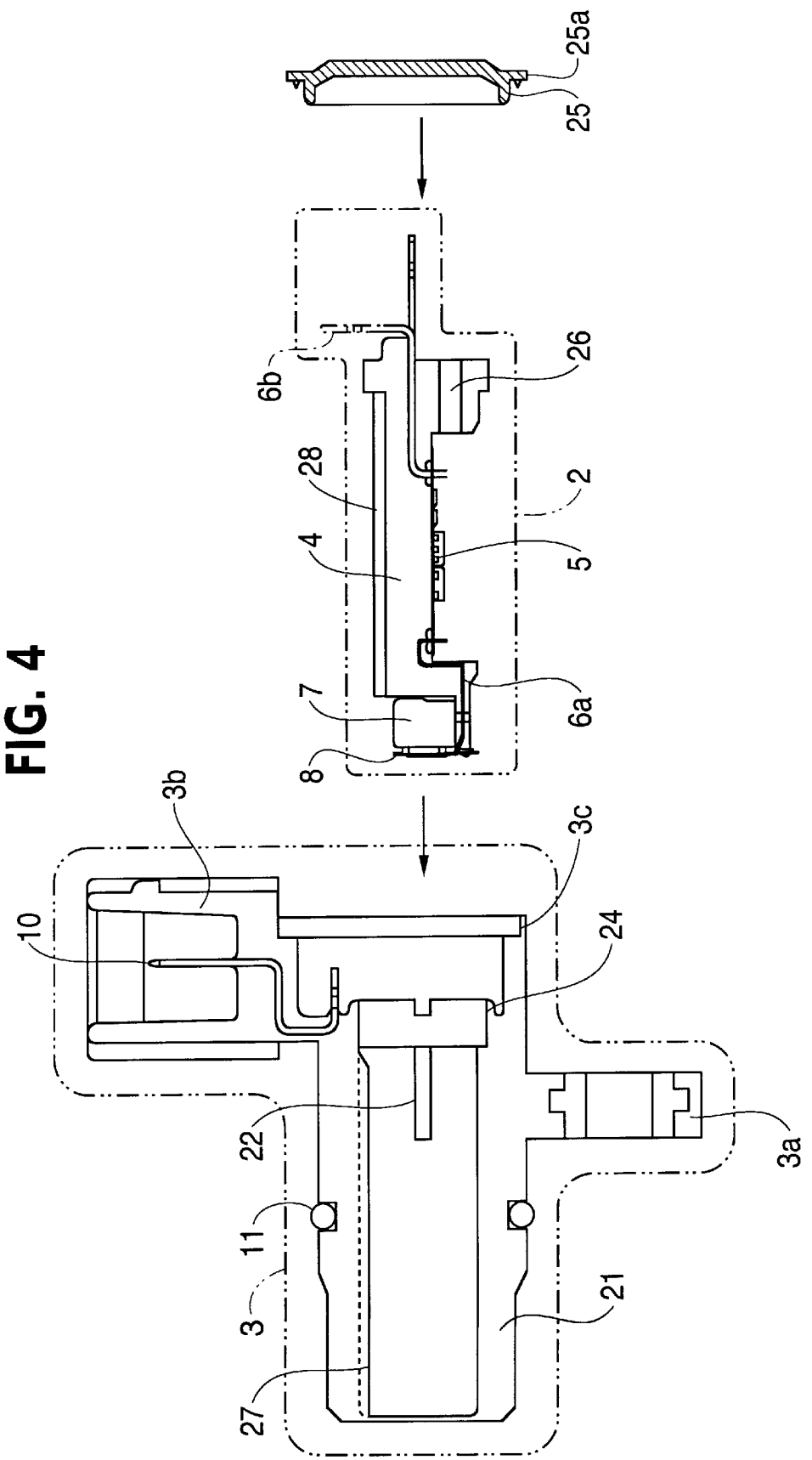
FIG. 4 is an assembly chart showing a magnetic revolution sensor according to a second embodiment of the present invention.

In the following, a magnetic revolution sensor according to a second embodiment of the present invention is described referring to FIG. 4. A magnetic revolution sensor of the present embodiment is comprised of three major blocks as illustrated in FIG. 4; a detection block 2, a connector block 3 comprising a case section 21 for housing the detection block, and a cover 25. Said connector block 3 comprises a case section 21 for accepting the detection block 2, a flange 3a and a male connector section 3b. Said detection block 2 comprises a holder 4 comprised of an insulation material, a bias magnet 7 mechanically fixed to one end of said holder 4, a magnetic detector 8 attached to said bias magnet 7, a circuit section 5 electrically connected with said magnetic detector 8 via a first relay terminal 6a provided on said holder 4, and a second relay terminal 6b electrically connected with the circuit section 5. The leadwire of said magnetic detector 8 is connected with the first relay terminal 6a by electric resistance welding, said circuit section 5 is constituted on a flexible circuit board.

Figure 5:
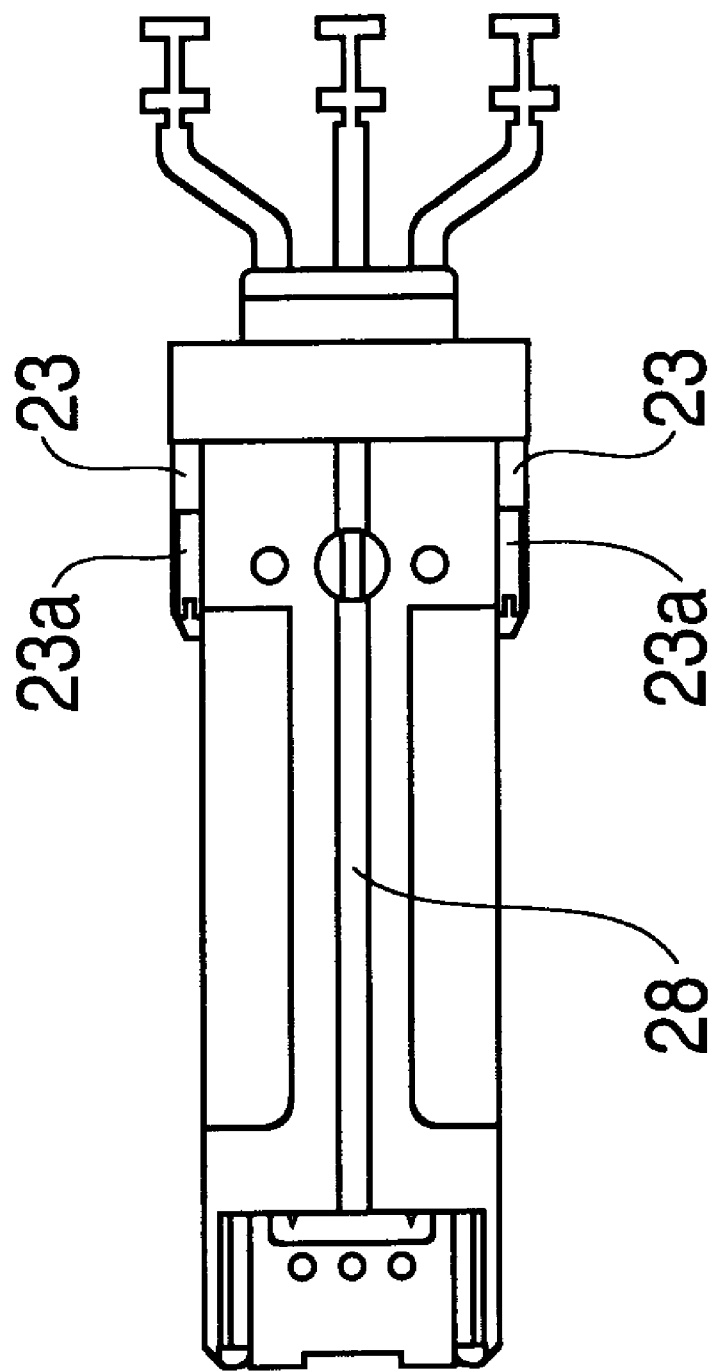
FIG. 5 is a top view of a detection block of the magnetic revolution sensor of FIG. 4.

The above described detection block 2 is provided with a guide groove 28 and a pair of key protrusions 23 on the holder 4, as shown in FIG. 4 and FIG. 5; and is coated with a water-repellent material. The detection block is tentatively fixed in the case section 21 of said connector block 3, and then finally glued to said connector block 3. Said case section 21 has a wall thickness thinner at the tip top where magnetic detector 8 of said detection block 2 is faced, and is provided with O-ring 11 at the outer surface. The above described case section 21 is provided with a key groove 22 for accepting the key protrusion 23 of said detection block 2 and a guide protrusion 27 for guiding the guide groove 28 of said detection block 2.

Said connector terminals 10 are provided in a space on said connector block 3, sharing a border with the opening of said case section 21; one end being guided to the opening of said case section 21, the other end to said male connector section 3b. Said detection block 2 and said connector terminals 10 are electrically coupled.

The assembly of a magnetic revolution sensor according to the present embodiment is started with the assembly of detection block 2. On the holder 4, a bias magnet 7 is fixed by gluing or such other method, and a magnetoresistive element or a semiconductor-type magnetoresistive element is glued as the magnetic detector 8 to the tip top of bias magnet 7. Leadwire of the magnetic detector 8 is electrically connected by electric resistance welding with one end of a first relay terminal 6a provided on the holder 4. The other end of first relay terminal 6a is electrically connected by soldering with a circuit section 5 attached on the holder 4. The circuit section 5 is electrically connected by soldering with a second relay terminal 6b. This completes the preparatory assembly of detection block 2.

The above described detection block 2 on holder 4 is then put into the case section 21 of connector block 3; tentatively mounted with the guide groove 28 fitted with the guide protrusion 27 and the key protrusion 23 with the key groove 22, and then finally fixed by gluing. The above described key protrusion 23 has a thicker part 23a, which part is inserted into the key groove 22. The holder 4 of the above described detection block 2 is provided with a through hole 26 for keeping the inside atmospheric pressure of case section 21 identical to the outside. The second relay terminal 6b of circuit section 5 is electrically connected by soldering with the connector terminals 10 of connector block 3. After the detection block 2 is built in, the connector block 3 is attached with a cover 25; the cover 25 is ultrasonic-welded to the groove 3c provided around the opening of case section 21 of connector block 3. The above described cover 25 is provided at the bottom surface with a ring protrusion 25a whose cross section has a triangular shape, the vertex part of ring protrusion 25a is welded around the opening of case section. Final fixing of the detection block 2 to the holder 4, after being housed in the case section 21, may be conducted either by thermal calking of a rib 24.

A magnetic revolution sensor thus assembled is built in an automotive transmission etc. The O-ring 11 provided around the outer surface of cap 1 works by its elasticity to fix the sensor against the inner wall surface of a hole provided in a transmission etc.

When different specifications, for example a different shaped male connector section 3b for meeting a customer connector, a different protrusion length from flange 3a of magnetic detector 8, are requested by customers, a magnetic revolution sensor according to the present embodiment can satisfy the requirements by providing only a plurality of connector blocks 3 having different shaped male connector section 3b, or different protrusion length of connector terminals 10 over the flange 3a, using the detection block 2, a sensor, as the common constituent component.

In a magnetic revolution sensor according to the present embodiment, the wall thickness of case section 21 is made thinner at the tip top part, so as the magnetic detector 8 of detection block 2 makes a closer access to a protrusion 9a of revolving magnetic substance 9. Therefore, the magnetic flux in the magnetic circuit comprising bias magnet 7 becomes denser; as a result, the operational reliability within a range of magnetic sensitivity of magnetic detector 8 is increased and the detection accuracy is improved.

In a magnetic revolution sensor according to the present embodiment, an O-ring 11 provided on the outer surface of case section 21 presses the inner wall surface of a hole provided in a transmission etc.; therefore, the oil-sealing character is enhanced. Furthermore, the detection block 2 is coated with a water-repellent material; therefore, even in a case when the inside of case section 21 is invaded by water the magnetic detector 8, circuit section 5 etc. are less affected by the water.

Figure 6:
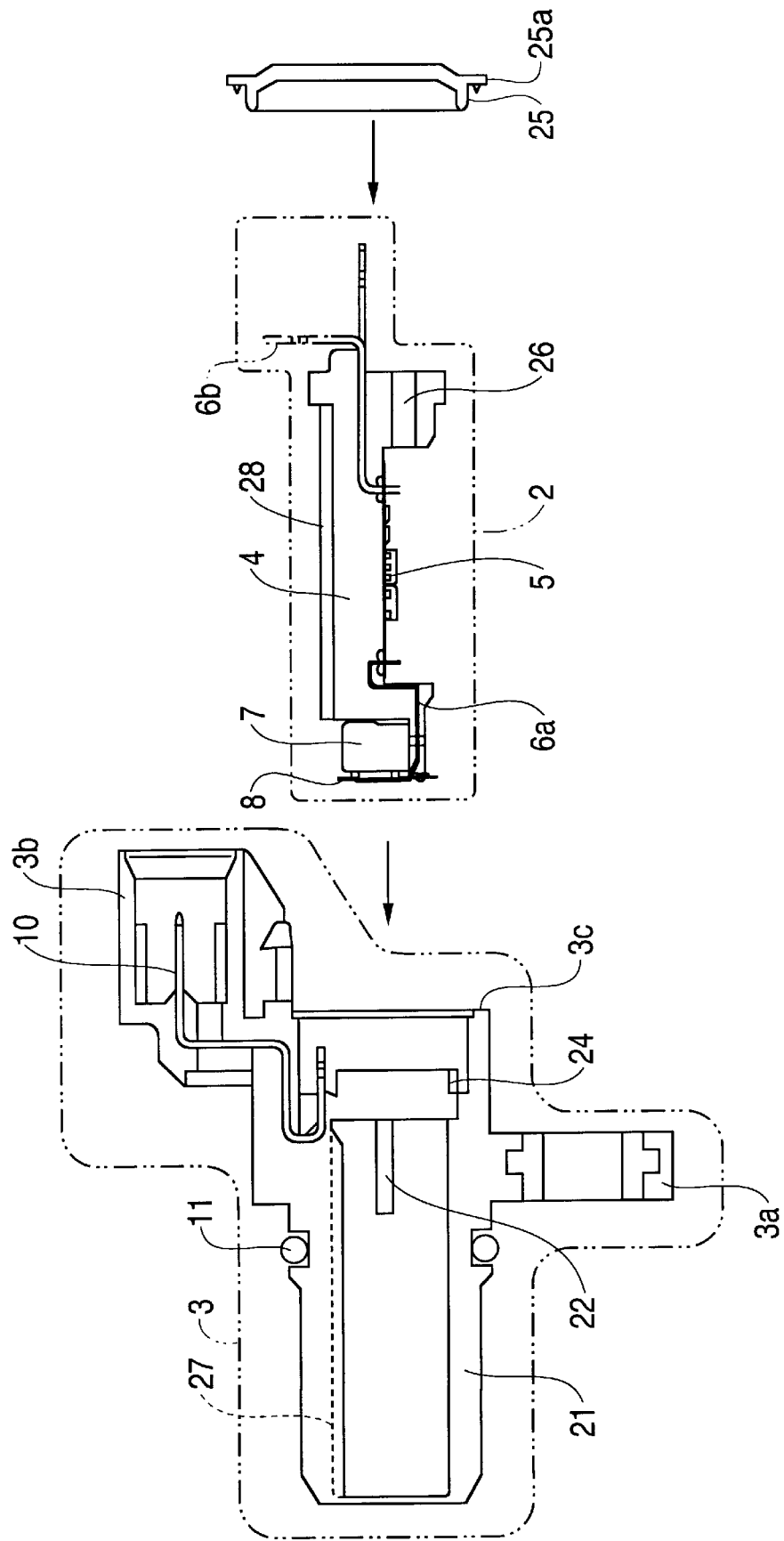
FIG. 6 is an assembly chart showing a magnetic revolution sensor according to a third embodiment of the present invention.
Figure 7:
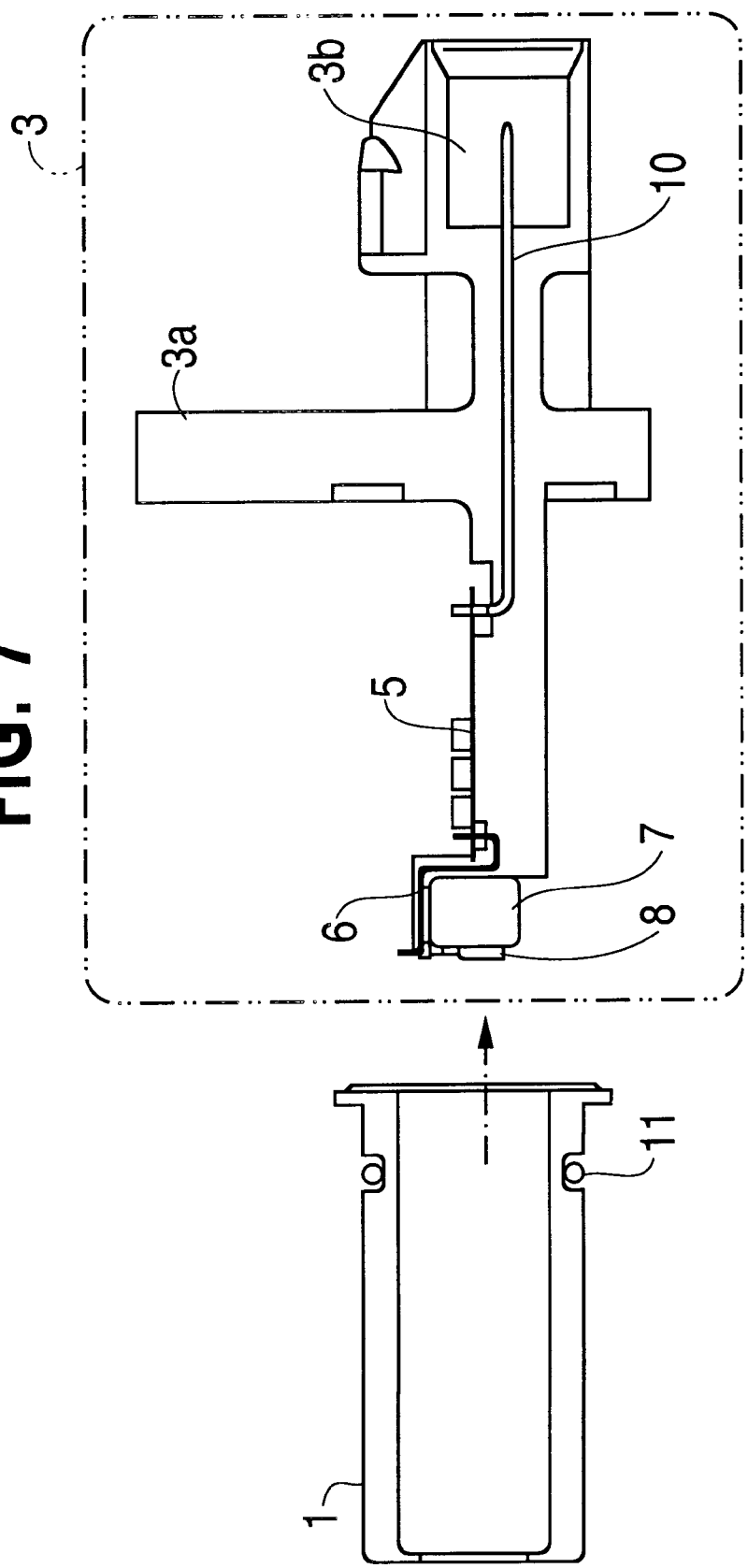
FIG. 7 is an assembly chart showing a prior art magnetic revolution sensor.

Although a magnetic revolution sensor of the second embodiment has a structure in which the direction of male connector section 3b is right-angled to the direction of case section 21, it may take other structure in which the direction of male connector section 3b is facing opposite to that of the case section 21 as shown in FIG. 6.

INDUSTRIAL APPLICABILITY

As described in the above, the present invention makes it possible to present highly reliable, yet inexpensive magnetic revolution sensors that meet the diversified connector requirements due to different connector specifications at customers, by modifying only the connector block and the cap. The detection block, being a key component bearing a decisive factor for the operational reliability, remains unmodified to be used as the common component having an established reliability.

What is claimed is:

1. A magnetic revolution sensor comprising:

a detection block comprising a magnetic detector;

a cap for protecting the detection block; and a connector block which comprises a flange provided with a space for installing said detection block and said cap, and connector terminals provided in a different end thereon separated by said flange, said detection block and said connector terminals being electrically coupled;

said cap having a wall thickness which thinner at a location adjacent said magnetic detector of said detection block, wherein said cap is ultrasonic-welded to an installation space of said connector block.

2. A magnetic revolution sensor, comprising:

a detection block comprising a magnetic detector;

a cap for protecting the detection block; and a connector block which comprises a flange provided with a space for installing said detection block and said cap, and connector terminals provided in a different end thereon separated by said flange, said detection block and said connector terminals being electrically coupled;

said cap having a wall thickness which thinner at a location adjacent said magnetic detector of said detection block, said detection block comprising:
  a holder comprised of an insulation material,
  a bias magnet mechanically fixed to one end of said holder, said magnetic detector mechanically attached to said bias magnet, and
  a circuit section electrically coupled with the magnetic detector via a relay terminal provided on said holder, wherein said relay terminal and leadwire of said magnetic detector are coupled by means of electric resistance welding.

3. A magnetic revolution sensor comprising:

a detection block comprised of a holder of an insulation material, a bias magnet mechanically fixed to one end of said holder, a magnetic detector mechanically attached to said bias magnet, and a circuit section electrically coupled with the magnetic detector via a relay terminal provided on said holder, being coated with a water-repellent material;

a connector block having a space for installing said detection block in one end, and a connector section in the other end thereon separated by a flange; and a cap which is to be ultrasonic-welded on the flange of said connector block for protecting the detection block fixed on said connector block in the installation space, and is provided with an O-ring for oilsealing on the outer surface; wherein the circuit section of said detection block is electrically coupled with connector terminals provided on said connector block so as the sensor signal from said magnetic detector is outputted to said connector section.

4. A magnetic revolution sensor comprising:

a detection block comprising a magnetic detector;

a connector block having a flange in a case section for housing the detection block, and connector terminals in the rear end thereof separated by the flange; and a cover for closing the opening of the case section on said connector block;

wherein said detection block housed in said case section of said connector block is electrically coupled with said connector terminals of said connector block, a guide groove that fits to a guide protrusion provided within said case section of said connector block, and a key protrusion that fits to a key groove provided within said case section; the detection block is tentatively fixed to said connector block by the coupling of said key protrusion to said key groove, and then finally fixed by gluing.

5. The magnetic revolution sensor of claim 4, wherein said detection block comprises;

a holder comprised of an insulation material, a bias magnet mechanically fixed to one end of said holder, said magnetic detector mechanically attached to said bias magnet, a circuit section electrically coupled with the magnetic detector via a first relay terminal provided on said holder, and a second relay terminal for connecting the circuit section out.

6. The magnetic revolution sensor of claim 5, wherein said circuit section is constituted on a flexible circuit board provided on said holder.

7. The magnetic revolution sensor of claim 5, wherein said circuit section is constituted with said relay terminal provided on said holder as wiring of the circuit.

8. The magnetic revolution sensor of claim 4, wherein the wall thickness of said case section of said connector block is made thinner in a tip top area where the magnetic detector of said detection block is faced.

9. The magnetic revolution sensor of claim 4, wherein the holder of said detection block is provided with a through hole for keeping the outside and the inside of said case section through.

* * * * *